Sept. 17, 1929.  K. SCHMIDT  1,728,633
SPEED REGULATOR
Filed Sept. 23, 1926    2 Sheets-Sheet 1
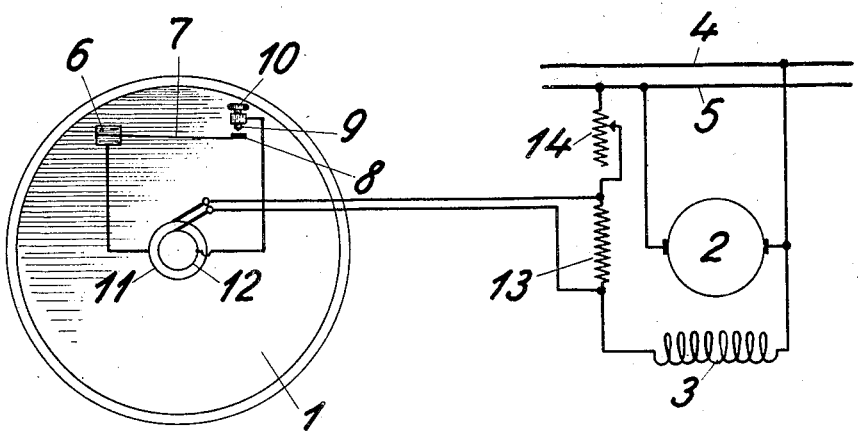
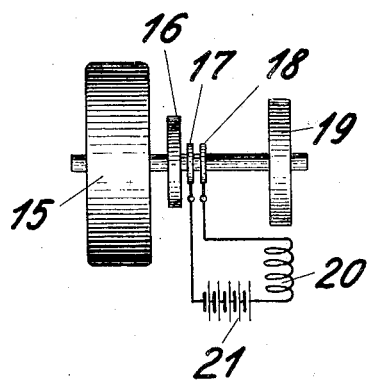
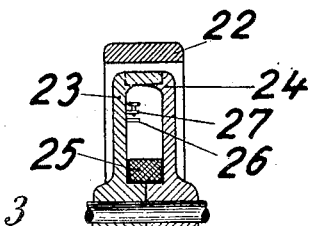
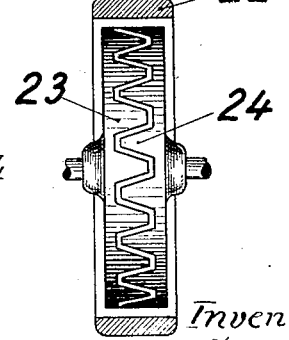
Inventor
Karl Schmidt
by
Attorney Sept. 17, 1929.    K. SCHMIDT    1,728,633
SPEED REGULATOR
Filed Sept. 23, 1926    2 Sheets-Sheet 2
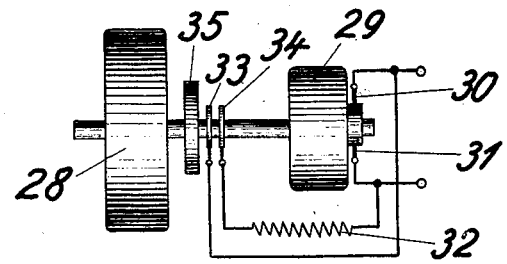
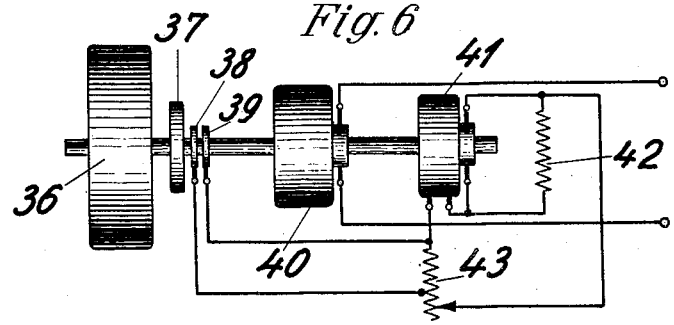
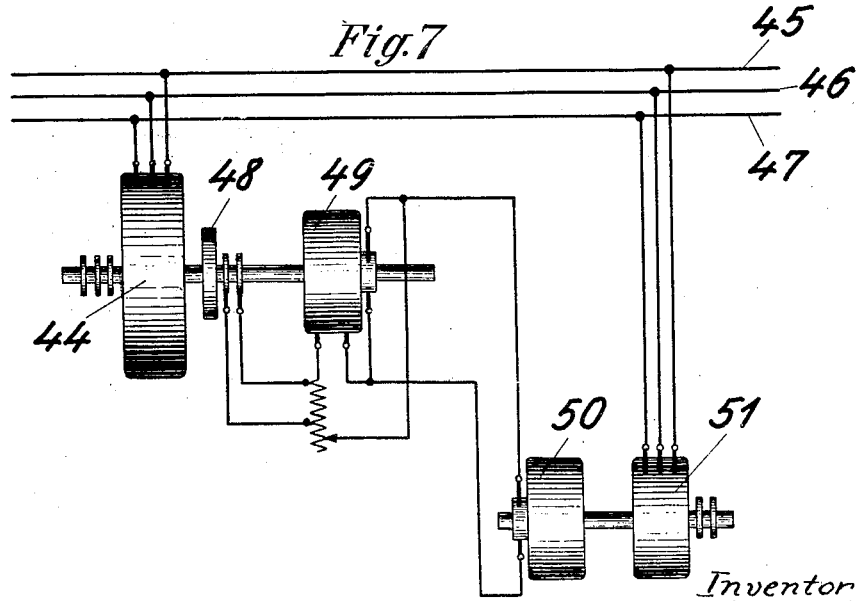
Inventor
Karl Schmidt
by
Attorney Patented Sept. 17, 1929

1,728,633

UNITED STATES PATENT OFFICE

KARL SCHMIDT, OF BERLIN-LICHTENRADE, GERMANY, ASSIGNOR TO C. LORENZ AKTIENGESELLSCHAFT, OF BERLIN-TEMPELHOF, GERMANY

SPEED REGULATOR

Application filed September 23, 1926, Serial No. 137,238, and in Germany December 18, 1925.

The present invention relates to speed regulators especially of the type, such as described in my U. S. application, Serial No. 686,432 acting upon the field of direct current shunt-wound motors in a manner to maintain the speed of revolution of the motor at a precisely constant value even with considerable variations of load. The said speed regulator operates according to the known principle of voltage regulators of the Tirrill system and is adapted to maintain the speed of a direct current motor at a constant value with great accuracy. But it has been heretofore a great drawback that only direct-current shunt-wound motors could be regulated according to this principle and it has not been possible thereby to regulate other prime movers subjected to load variations, as for instance internal combustion engines or wind motors, such as screw-propeller motors for driving electric generators on aeroplanes, and especially three-phase electric motors which are superior in many respects to direct-current motors.

It is the object of the present invention to overcome these objections by the provision of a speed regulator which may be used in connection with all kinds of prime movers. The special feature of the invention is that the regulator, instead of acting upon the field of the prime mover, as has heretofore been the case with direct current shunt-wound motors, acts upon an additional electrically controlled braking device, such as for instance an electric eddy-current brake, or the load of a special electric machine driven by the prime mover itself. The whole plant is thereby so adjusted that at normal conditions only small amounts of energy are wasted by the braking action. The regulator in question, operating through centrifugal force having a constant value and the force of gravity varying sinusoidally, to govern a fixed and a resilient contact of a contacting device, close contacting devices once each revolution so that a continuous regulating influence is maintained. As soon as the prime mover tends to increase its speed, the speed regulating device undergoes a longer contact making period per revolution and an electric current controlled by the contacting device assumes immediately a new mean value and introduces directly or indirectly a stronger braking action. In case the speed tends to decrease below its normal value the regulation action takes place in the reverse direction. It is to be understood, however, that the invention may be applied to every kind of contact speed regulator, and that it is not limited to the application of the special regulator above-mentioned according to application, Serial No. 686,432.

To make the invention clear, reference may be taken to the accompanying drawings. Figure 1 shows a sketch of the speed regulating contacting device together with a diagram of connections for holding constant the speed of a D. C. shunt-wound motor. Figure 2, in which parts are shown diagrammatically represents the simplest form of means for carrying the present invention into practice and which is suitable for every kind of prime mover and is in no way restricted to shunt-wound D. C. motors.

Figures 3 and 4 depict a suitable form of eddy-current brake to be employed in accordance with the invention.

Figures 5–7 represent schematically further improved means for carrying the invention into practice.

Referring to Figure 1, a disc 1 is mounted on the shaft of the prime-mover whose speed is to be regulated in this case a shunt-wound D. C. motor having an armature 2, field windings 3 and being fed from supply mains 4 and 5. A flat spring 7 is mounted on the disc 1 by means of a clamp 6 and bears a contact weight 8 at its free end. This contact 8 is confronted by a stationary contact 9 fixed on the disc 1 and which may be adjusted by the aid of screw 10. The contacts 8 and 9 are in conductive connection with the terminals of a resistance 13 included in the shunt circuit of the motor by means of slip-rings 11 and 12. A variable resistance 14 in the shunt circuit of the motor serves to adjust its normal speed at a desired value. The contacts 8 and 9 are opened and closed in accordance with speed variations thereby disconnecting and connecting respectively the resistance 13 in the shunt circuit and controlling the speed of the motor. The resiliency of the spring 7 and its contact weight 8 may be so chosen and designed that according to the above mentioned special type of speed regulators contact between 8 and 9 takes place once each revolution by the coaction of the centrifugal force bending the spring outward and acting steadily and the gravity force acting in the like sense with it only a fractional part during one revolution i. e. when the spring comes within its lowest position, provided the disc is rotating in a vertical plane. The result is a steady regulating action substantially independent of the speed similar to that well known in connection with voltage regulators for electric generating systems according to the Tirrill principle. An accuracy of speed constancy with hitherto unknown limits is thereby obtained. Fig. 2 in which parts are shown diagrammatically, represents the simplest form of means for carrying the invention into practice which is suitable for every kind of prime mover. 15 indicates the prime mover to be held at a constant speed (electric three-phase machine, wind motor, etc.), which bears on its shaft a disk 16 on which is mounted the regulator. 17 and 18 are the two slip-rings (corresponding to 11 and 12 according to Fig. 1) for carrying the current which is to be controlled by the contacts of the regulator. Mounted further on the shaft of the prime mover 15 there is an electric brake 19 actuated by a braking magnet coil 20. The braking magnet coil is fed by the braking current of a current source 21 which current is controlled by the regulator. For this purpose the two contacts of the regulator are connected with the slip-rings which contain in series the source 21 and the magnet 20. As soon as the prime mover 15 tends to increase its speed, there results e. g. in the case of the regulator mentioned above a change in the duration ratio of contact making to contact opening within one revolution, i. e., in the case mentioned, an increase of same. The mean value of the braking current automatically without any delay assumes a higher value, producing therefore an enforced magnetic field of the braking magnet followed by an increasing braking action, or in other words, producing an action tending to restore the original speed of revolution.

Figs. 3 and 4 show a cross-section and a plan view respectively of a brake especially suited for this purpose. A stator 22 having the form of a closed solid iron ring encloses a rotor consisting of two parts 23 and 24 having teeth engaging each other. The exciter winding is indicated at 25 and is arranged between the parts 23 and 24. The magnetic flux passing from the rotor 23, 24 to the stator 22 on account of the toothed structure of the former undergoes periodic variations dependent on the speed of revolutions, thereby generating eddy-currents in the stator 22 which produce the braking action. This brake may suitably serve as support for the regulator contacts 26 and 27 (corresponding to 8 and 9 according to Fig. 1) so that an independent regulator disk may be dispensed with, the brake taking its place.

The braking of the prime mover may also be carried out in a purely electric manner by consuming the braking energy in resistances, which method may be easily employed in case the prime mover is driving a dynamo machine, as represented diagrammatically in Fig. 5. Here the prime mover 28 is coupled with a dynamo 29, the brushes 30 and 31 of which are connected in series with a load resistance 32 to the slip-rings 33 and 34 of the regulator 35. This arrangement produces the same effect as the aforementioned brake. If in this case the prime mover is increasing its speed, the terminal voltage of the dynamo and consequently the current in the load circuit containing the resistance 32 increases accordingly, the load of the machine is increased and a decrease of its speed of revolution takes place. However, there exists a certain drawback with this arrangement in that the terminal voltage of the dynamo 29 undergoes variations due to load variations in the load circuit 34, 33, 32, 31, 30 and in that in dealing with large energies the regulator contacts have to carry large amounts of current which they are not able to do and whereby a burning out of same may result.

The arrangement of connections diagrammatically shown in Fig. 6 avoids these inconveniences in that the regulator contacts do not produce the braking action directly, but influence the exciter field load of an additional small loading dynamo suitably mounted on the same shaft which for its part works upon a load resistance. According to Fig. 6, 36 denotes the prime mover, 37 is the regulator with slip-rings 38 and 39, 40 represents the generator driven by the prime mover and 41 the special regulating dynamo working upon a load resistance 42 (incandescent lamps, etc.). As may be seen from the drawing the regulator contacts work upon a part of the field resistance 43 of the regulating dynamo and therefore have to carry only a small amount of current. The action corresponds in its other details with the apparatus shown in Fig. 5. Instead of the special regulating dynamo 41 there may be employed in lieu thereof in the organization shown in Fig. 2, an eddy-current brake such as the brake shown in Figs. 3 and 4.

If there are very large machines to be regulated, where the regulating energy may cause considerable losses, a regenerative braking may be employed, i. e., the braking energy may be fed back into the feeding mains. Fig. 7 shows such an arrangement in connection with a three-phase induction motor as prime mover and regulation operating without energy losses. The three-phase motor 44 fed by the mains 45, 46, 47 is fitted with a regulator 48 and bears on its shaft a regulating dynamo 49 whose field is controlled by the regulator 48 as in the structure shown in Fig. 6. The dynamo acts upon a separate regulating (loading) converter set consisting of a direct-current motor 50 and a synchronous alternator 51. The energy generated by the alternator 51 is fed back into the mains 45, 46, 47.

Having now fully described my invention, what I claim is:

1. An electric speed regulating device for prime movers comprising a rotating member the speed of which varies as the speed of the device to be regulated, an electric contact element resiliently mounted on said member and so spaced from the axis of rotation of said member as to be responsive to centrifugal force, said axis being arranged horizontally so as furthermore to subject said element to periodic reversals of the effect of gravity, an electro-dynamic device driven by said prime mover and a circuit of said device including said contact element.

2. An electric speed regulating device for prime movers comprising a rotating member, the speed of which varies as the speed of the device to be regulated, an electric contact element resiliently mounted on said member and so designed and spaced from the axis of rotation of said member as to be responsivve to centrifugal force, said axis being arranged horizontally so as to furthermore subject said element to periodic reversals of the effect of gravity on the same, and an electro-dynamic brake acting on the speed of said rotating member, said brake comprising a magnetic field controlled by said contact element.

3. In an electric speed regulating device, a prime mover, a contact element, means controlled by said prime mover to subject said element to a substantially constantly acting force dependent on the speed of said prime mover, said means furthermore subjecting said element to a periodically acting force of substantially constant frequency and amplitude, and an electric braking device acting on the speed of said prime mover and having a magnetic braking field controlled by said contact element.

4. In an electric speed regulating device, a prime mover, a pair of contact elements, means associated with said prime mover for periodically closing said contact elements, said means maintaining said contacts closed over variable periods of time in accordance with the speed of said prime mover, an electric braking device for controlling the speed of said prime mover and having a magnetic braking field and means whereby said contact elements control the operation of said magnetic braking device.

5. An electric speed regulating device, a prime mover, a pair of contacts, periodically closed, means controlled by the speed of said prime mover for maintaining said contacts closed over variable periods of time in accordance with the speed of said prime mover, an electrical speed control device mechanically connected to said prime mover and a circuit for said device controlled by said contact elements.

6. In an electrical speed regulating device, a prime mover, a pair of contacts, means associated with said prime mover for periodically closing said contacts independently of the speed of said prime mover, said means being dependent on the speed of said prime mover for maintaining said contacts closed over variable periods of time, an electrical device mechanically connected to said prime mover for controlling the speed thereof and means controlled by said contacts for operating said electrical device.

In testimony whereof I have affixed my signature.

KARL SCHMIDT.